United States Patent [19]
Brorein

[11] Patent Number: 4,467,138
[45] Date of Patent: Aug. 21, 1984

[54] PLURAL CONDUCTOR COMMUNICATION WIRE

[75] Inventor: William J. Brorein, Whippany, N.J.

[73] Assignee: GK Technologies, Inc., Greenwich, Conn.

[21] Appl. No.: 458,300

[22] Filed: Jan. 17, 1983

[51] Int. Cl.³ .................... H01B 11/02; H01B 7/08
[52] U.S. Cl. ......................... 174/115; 174/41; 174/70 A; 174/117 F; 350/96.23
[58] Field of Search ........... 174/41, 70 A, 115, 117 R, 174/117 F; 350/96.23

[56] References Cited
U.S. PATENT DOCUMENTS

| | | | |
|---|---|---|---|
| 2,014,214 | 9/1935 | Smith | 174/115 |
| 2,212,927 | 8/1940 | Baguley | 174/115 |
| 2,663,755 | 12/1953 | McBride | 174/117 R |
| 2,950,338 | 8/1960 | Taylor | 174/117 F |
| 3,297,814 | 1/1967 | McClean et al. | 174/115 |
| 3,549,788 | 12/1970 | Apen | 174/115 |
| 3,600,500 | 8/1971 | Schoerner | 174/115 |
| 3,676,576 | 7/1972 | Dubernet et al. | 174/126 CP X |
| 4,009,932 | 3/1977 | Ferrentino | 350/96.23 |
| 4,220,812 | 9/1980 | Ney et al. | 174/117 F |
| 4,227,041 | 10/1980 | Den et al. | 174/117 F |
| 4,365,865 | 12/1982 | Stiles | 350/96.23 |

FOREIGN PATENT DOCUMENTS

| | | | |
|---|---|---|---|
| 699495 | 12/1964 | Canada | 174/117 R |
| 150675 | 12/1974 | Japan | 174/117 F |
| 1422147 | 1/1976 | United Kingdom | 350/96.23 |

Primary Examiner—G. P. Tolin
Assistant Examiner—Morris H. Nimmo
Attorney, Agent, or Firm—Hopgood, Calimafde, Kalil, Blaustein & Judlowe

[57] ABSTRACT

A communication wire of flat construction has two or more pairs of communication gage polyolefin insulated wires, twisted along their length, disposed in groups on opposite sides and parallel to a conductive steel wire. The steel wire may be galvanized or copper clad. All of the foregoing are embedded in a PVC jacket with the PVC material bonded to the steel wire but unbonded to the insulated communication gage wires. Weakening lines permit separation into central and side parts with an intact PVC jacket on each part. When used as telephone drop wire the steel wire provides both physical support and electrical conductivity for supplemental or primary grounding. The wire shape and size permits use of existing hardware for installation. Alternatively, a group of wires on at least one side is replaced either by a coaxial cable or by one or more polyolefin jacketed optical fiber conductors.

15 Claims, 10 Drawing Figures

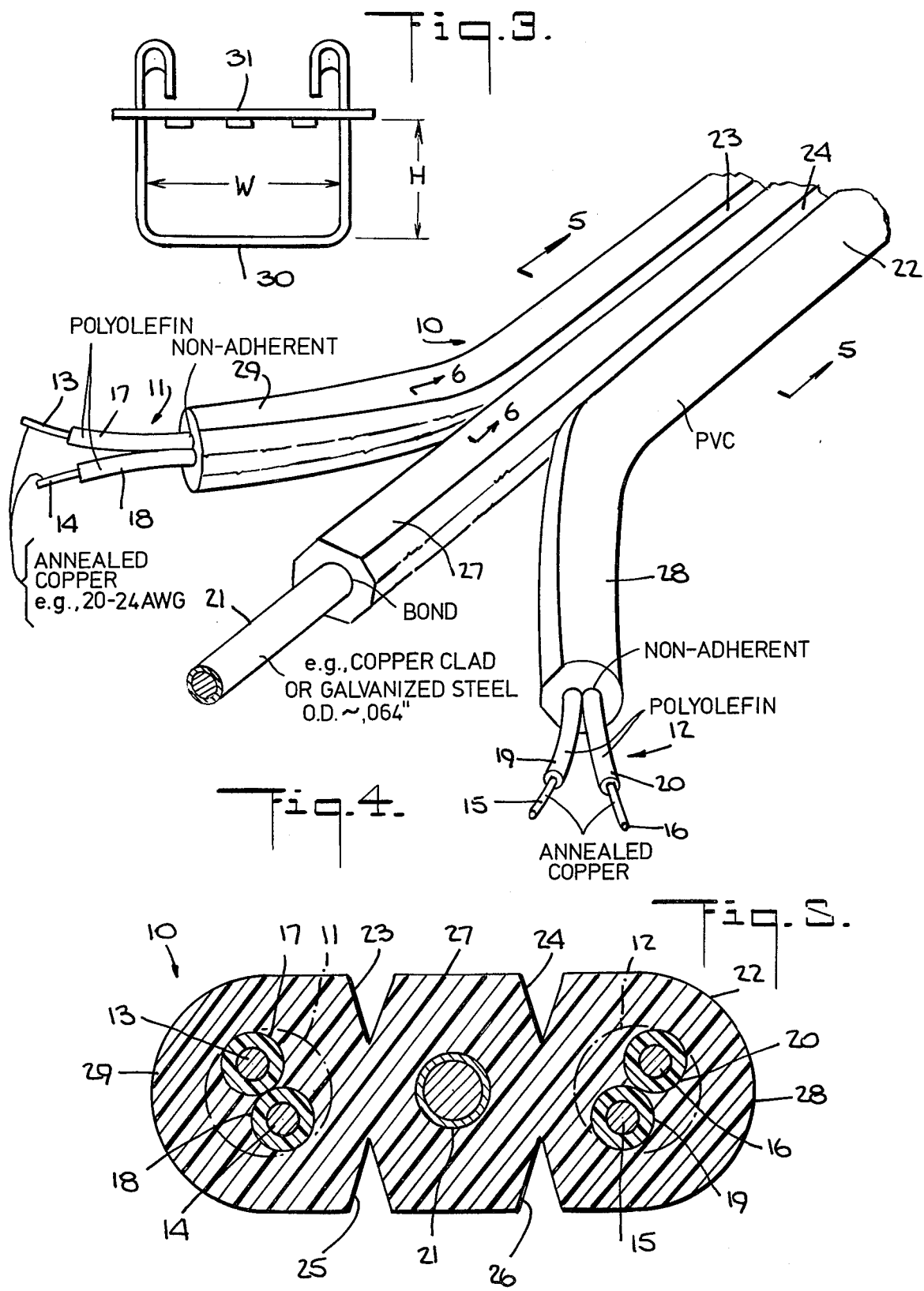

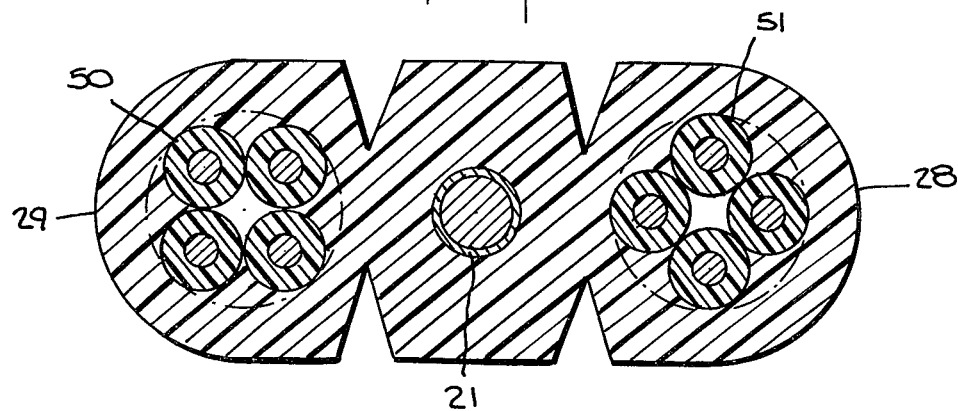
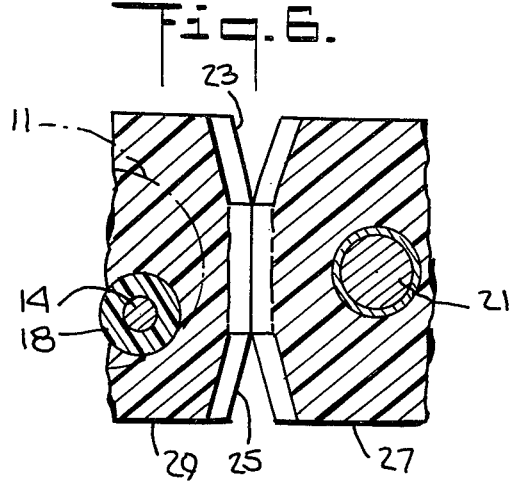
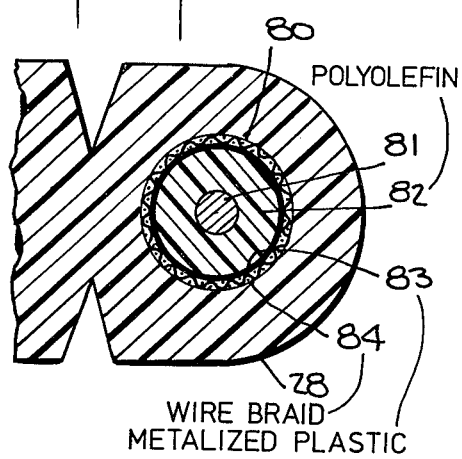
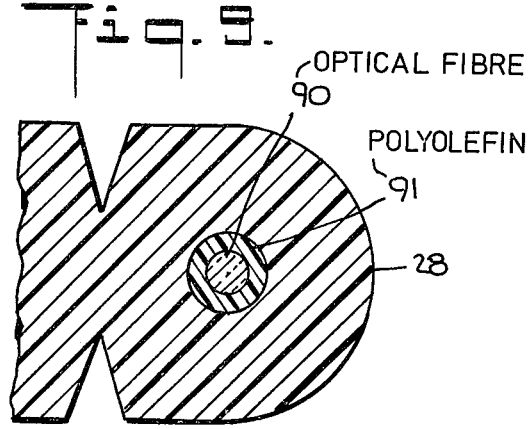
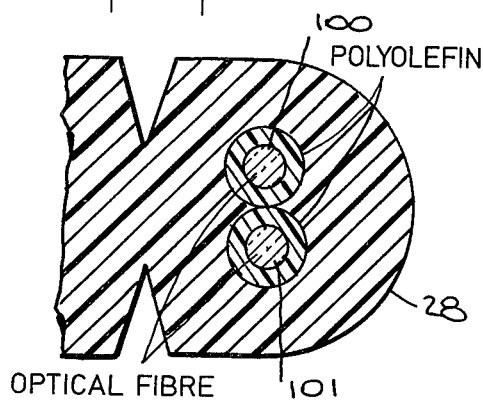

PLURAL CONDUCTOR COMMUNICATION WIRE

BACKGROUND OF THE INVENTION

The present invention relates to a signal conducting wires or conductors, particularly to those used by the telephone industry.

Present day telephone distribution is accomplished between a central office and local subscribers by main distribution or feeder cables branching out into individual trunk and local lines. Above ground distribution for residential service utilizes pole supported cables feeding terminals from which drop wires continue the connection to the various buildings being served. The present invention provides a new drop wire and a new approach to drop wire installation.

The drop wire has traditionally consisted of a single conductive pair suitably insulated and strengthened to be weatherproof and to withstand the stresses encountered in runs of up to 200 ft. from pole to building. Generally where residential service is involved, a separate single pair drop wire is installed using separate installation hardware for each phone line requested by the customer. It should be evident that this practice, particularly if the lines are not ordered at the same time, entails doubling up on expense both for parts and labor.

There was a time when the standard drop wire consisted of two conductors, rubber insulated, and covered with neoprene. More recently, an all PVC insulated drop wire was developed and received some acceptance by the industry. Also accepted by the industry is a wire construction developed by the assignee of the present invention. Known as "Alpha-Tel" drop wire, it contains a pair of 18½ AWG (0.0385"), 30% conductivity copper clad steel wire conductors. The insulation-jacket on such wire has been formulated of ethylene/propylene rubber (EPR).

The configuration is generally flat with overall cross-sectional dimensions of about 0.135"×0.220". The breaking strength of such wire is about 230 pounds.

In the past attempts were made by others to produce plastic insulated drop wire constructions having performance capability comparable to that of the rubber insulated variety. Thus, there is described in Taylor U.S. Pat. No. 2,950,338, issued Aug. 23, 1960 for "Plastic Insulated Electrical Line and Mounting Therefor," "a drop-wire having at least one wire conductor of a size in cross-section determined by the current carrying capacity required thereof and a support or strength member, as for example a steel wire, of substantially larger diameter than the conductor, both the conductor and support member being embedded in spaced parallel relation to each other in a thermoplastic insulation, such as polyethylene; together with a clamp which is adapted and arranged to bite through the insulation of the wire in a direction substantially perpendicular to the plane defined by the support member and conductor, whereby the jaws of said clamp are brought into direct frictional engagement with the support member but are prevented from coming into contact with the conductor by such engagement with the support member. The clamp, thus firmly gripping the drop-wire, is then fastened to the pole or building, as the case may be, so that the weight of the span of drop-wire is carried by the clamp which, being in rigid engagement with the support member in the wire, transmits all the tensile forces to that member instead of to the jacket or conductors of the drop-wire." A specific embodiment is described in the patent as comprising a 1/16" diameter galvanized steel wire that functions as a central support member having a tensile strength on the order of 135,000 p.s.i. The embodiment is stated as being capable of meeting the alleged minimum 400 pound tensile load requirements for standard telephone drop-wire. In addition, two bare soft copper conductors of No. 22 AWG wire are located parallel to and on opposite sides of the support member. The three wires are embedded in polyethylene insulation.

One of the advantages specifically ascribed by Taylor to his drop wire is that in installations where an electrical ground is not readily available the support member in the drop wire may be used as the ground. In that event the support wire was to be connected to a suitable ground at the telephone pole. It was of the essence in the Taylor concept, as asserted in his patent, that the support member be of larger diameter than the conductors and that the conductors be positioned such that the jaws of the mounting clamp could be forced through the insulation into direct contact with the support member without engaging the conductors.

Drop wires in current use are generally of flat construction and are engaged by a wedge type clamp for fastening to poles, trees, buildings and other supporting structure. Such clamps are known as "P" clamps.

SUMMARY OF THE INVENTION

With the preceding information as background, a new drop wire has been conceived having considerable advantage over anything heretofore known. In accordance with one aspect of the present invention there is provided a communication wire of generally flat construction especially adapted for telephone drop wire service, the wire being separable along longitudinal weakening lines into a central and two side portions, the central portion containing a length of steel wire surrounded by and adherently embedded in a body of PVC material, each of said side portions containing, non-adherently embedded in a continuation of said body of PVC material, at least one polyolefin covered communication conductor.

BRIEF DESCRIPTION OF THE DRAWINGS

The invention will be better understood after reading the following detailed description of the presently preferred embodiments thereof with reference to the appended drawings in which:

FIG. 3 is an end view of a "P" clamp showing certain critical or limiting dimensions;

FIG. 4 is an enlarged perspective view of an end of a drop wire embodying the invention and showing certain features contributing to its utility;

FIG. 5 is a transverse sectional view taken along line 5—5 in FIG. 4;

FIG. 6 is a fragmentary cross-sectional view taken along line 6—6 in FIG. 4;

FIG. 7 is a view similar to FIG. 5, but showing a modification of the invention containing star quad conductor grouping;

FIG. 8, is a fragmentary sectional view similar to FIGS. 5 and 7 but showing a modification containing a coaxial cable;

FIG. 9, is a view similar to FIG. 8 but showing a modification containing an optical fibre conductor; and FIG. 10, is a view similar to FIG. 9 but showing a modification containing a plurality of optical fibre conductors.

The same reference numerals are used throughout the drawings to designate the same or similar parts.

DETAILED DESCRIPTION OF THE PREFERRED EMBODIMENTS

Figure 1:
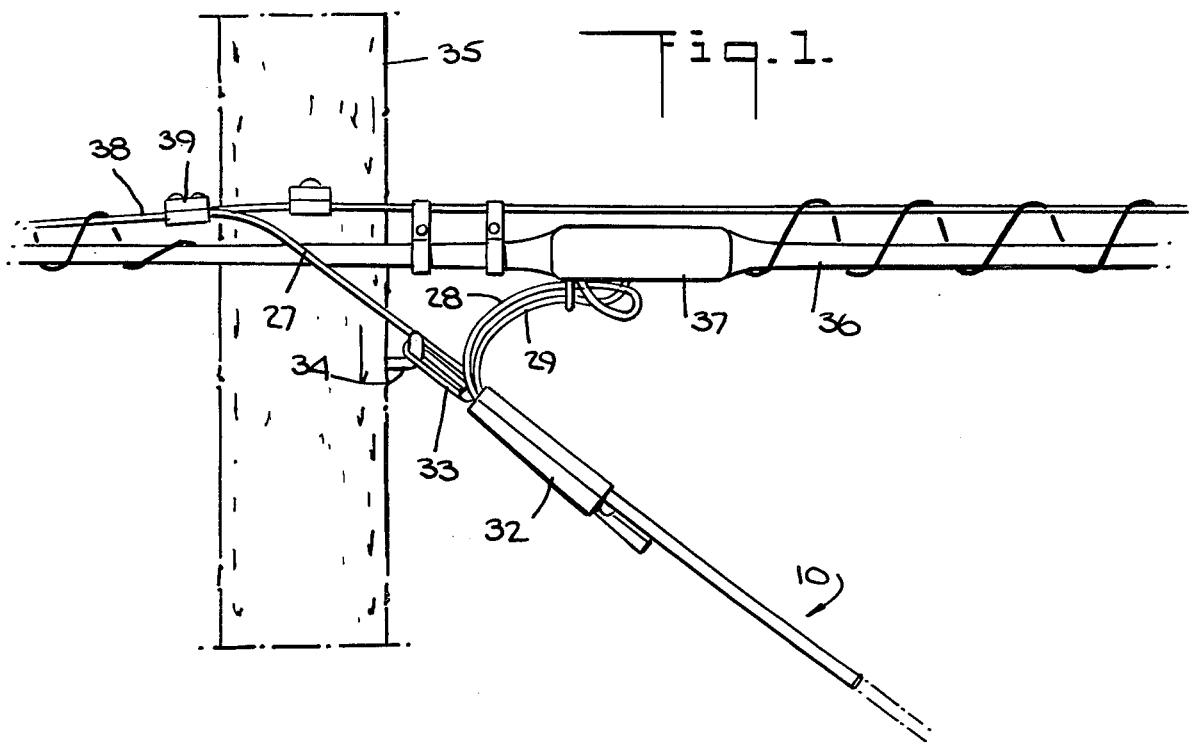
FIG. 1 is a fragmentary view of a cable installation secured to a utility pole and showing the connection of the new drop wire to a cable terminal.

Reference should now be had to FIGS. 4, 5 and 6 wherein is illustrated a drop wire designated generally by the reference numeral 10 constructed in accordance with the present invention. This particular embodiment contains two pairs, 11 and 12, of insulated communication gage conductors. The pair 11 consists of conductors 13 and 14 while the pair 12 consists of conductors 15 and 16. In the particular example the conductors 13 to 16 are of annealed copper of 23 AWG, having a nominal OD of 0.0226 inches, each conductor being individually insulated by a layer of polyolefin material having a thickness of approximately 11 mils. A preferred insulation is high density polyethylene. The insulating layers are designated, respectively, by the numerals 17, 18, 19 and 20 for the conductors 13, 14, 15 and 16. Each of the pairs 11 and 12 is twisted throughout the length of the drop wire with the lay of the twist differing between the two pairs in order to reduce any crosstalk therebetween in known manner. Satisfactory dimensions for the respective lay is approximately 4½ inches for one pair and 5 inches for the other pair.

As seen in the drawings the pairs 11 and 12 are located on opposite sides of a central reinforcing or support wire 21 which in the present example consists of a copper clad steel wire. In the preferred example the wire 21 has a diameter of 0.064 inches.

The twisted pairs 11 and 12, straddling the support wire 21, are all embedded within a jacket layer 22 of PVC material. Preferably the PVC material is pressure extruded and loaded with carbon black and other known additives to produce a jacket that is resistant to sunlight and flame. The PVC layer while embedding the polyolefin insulated conductors of the pairs 11 and 12 does not bond to the polyolefin material. However, it is essential that the PVC material be bonded and adhere to the surface of the wire 21. Such bonding can be achieved by heating the support wire 21 so that its surface is hot when extruding the PVC material thereover. Bonding can also be achieved or enhanced by use of a suitable adhesive.

The PVC layer 22 is provided with longitudinal weakening lines or grooves of "V" configuration 23, 24, 25 and 26 that are related by shape and size to the strength of the material such that the wire is separable along the weakening lines into a central portion 27 and two side portions 28 and 29. As best seen in FIG. 4, the central portion 27 contains the length of steel wire 21 still surrounded by and adherently embedded in the PVC material. Each of the side portions 28 and 29 contains a respective group or pair 11 or 12 of the polyolefin insulated communication gage conductors with the insulated conductors being non-adherently embedded in the PVC material.

The drop wire of the present invention is intended to be used with the standard "P" clamp shown in end view in FIG. 3. Said clamp, as is well-known, consists of a generally U-shape body portion 30, a shim 31, and a wedge with bail, not shown. The wire to be secured is positioned in the clamp in the space between the shim 31 and the bottom of the U-shape body 30 with the wedge pressing the shim down on the wire to obtain a grip upon the latter. Typical dimensions of the clamps in use are approximately ¼ inch for the dimension "H" and ½ inch for the dimension "W" as shown in FIG 3. However, the presently preferred dimensions for the subject drop wire illustrated in FIG. 4 are approximately 0.410 inches for its width and 0.150 inches for its thickness. A typical weakening groove, 23 to 26, may have a depth of about 50 mils and be about 25 mils wide at its widest point. Sufficient PVC material should be provided between the support wire 21 and the adjacent twisted pairs 11 and 12, respectively, such that when the side portions 28 and 29 of the wire are separated from the central portion 27 a complete encirclement of PVC material remains around each of the conductor pairs as well as the support wire.

Figure 2:
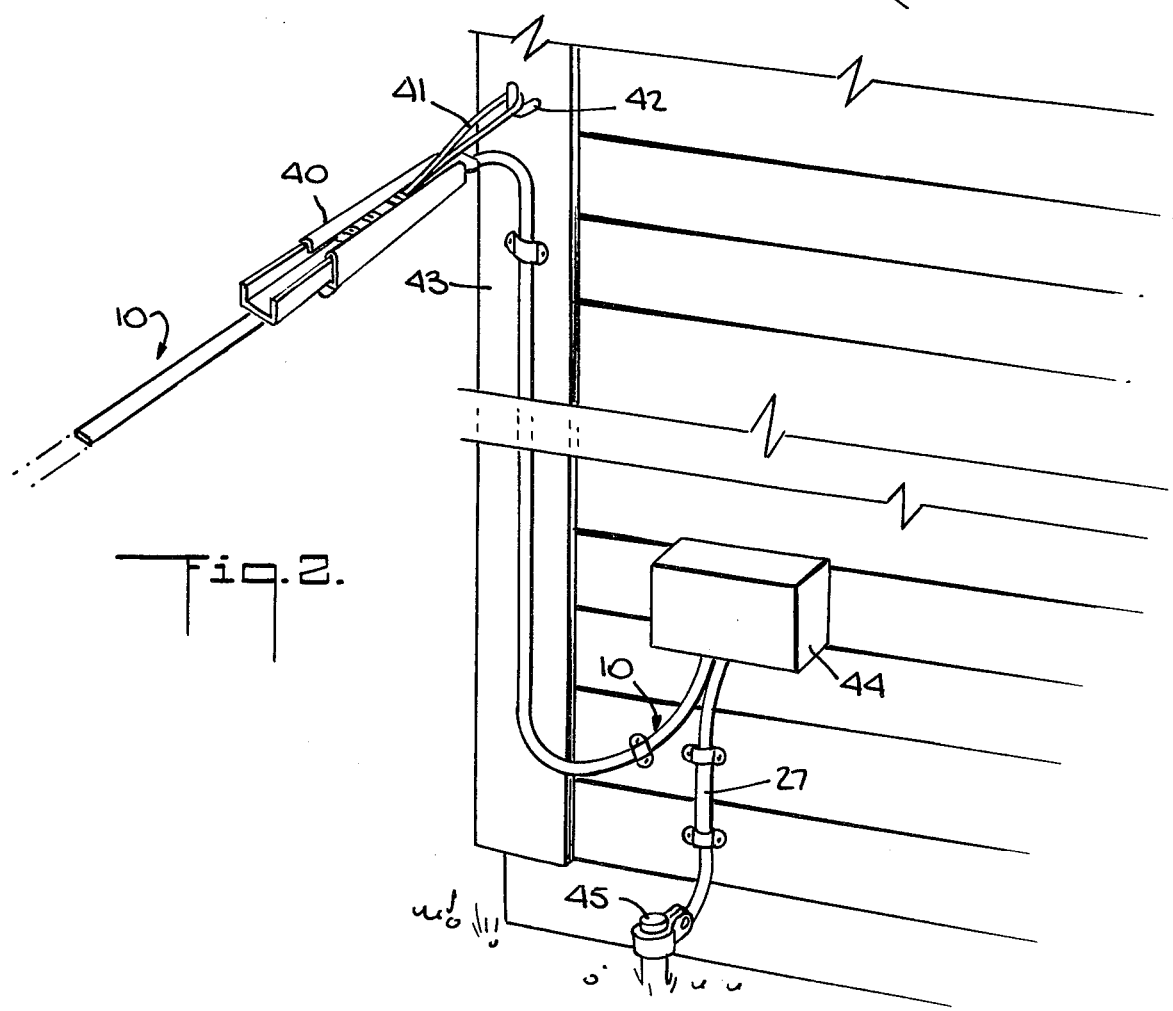
FIG. 2 is a fragmentary view of the other end of the drop wire showing its connection to a building, entry and ground terminations.

When the support wire is installed it might be used as shown in FIGS. 1 and 2 wherein the wire 10 is secured within a "P" clamp 32 which has its fastening or anchoring bail 33 secured to a "J" hook 34 located on the utility pole 35. A sufficient length of the drop wire at the end projecting above the clamp 32 is separated so that the conductor pairs 11 and 2, still embedded within the PVC jacket material 22, can be connected to the main cable 36 within the terminal 37. The support wire 21, also still encased within the PVC material, is carried forward to the main cable support or messenger wire 38 to which it is connected by a clamp 39 after suitably bearing a length of the wire 21 in order to establish an electrically conductive connection to the wire 38. Since the wire 38 is normally grounded, the last mentioned connection will serve to ground the wire 21 which has a conductivity of at least 15% of that of standard copper wire.

At the opposite terminus the drop wire 10 will be secured within another "P" clamp 40 having its fastening bail 41 disposed around another "J" hook 42 secured in the side of the building 43. The drop wire is then brought down the side of the building and enters the building through the protector 44. Within the protector the wire 10 divides with the central portion 27 being brought out and connected to the ground terminal which may additionally be connected to a grounding stake 45. The ground connection to the messenger wire 38 serves to supplement the normal house ground or replace such ground where inadequate local grounding is available.

While the foregoing example was described with reference to particular size wires and material, it should be obvious that it is subject to considerable variation. As seen in FIG. 7 it is possible to produce a drop wire with more than one pair on each side of the support conductor. As shown in FIG. 7 the conductor groups consist of star quads, 50 and 51, each having four polyolefin insulated conductors that are twisted as a group along their length, each group being twisted with a different lay. In all other respects the wire in FIG. 7 may be similar to the wire described with reference to FIGS. 4, 5 and 6.

Instead of 23 AWG wire being used for the twisted pairs, the gage may conveniently be selected from the range of 20 AWG to 24 AWG, the range normally used by the telephone industry. Other wire sizes can also be employed. The central support wire 21 preferably has a tensile strength of at least 150,000 p.s.i. By ensuring bonding between the support wire 21 and the PVC jacket it is not necessary that the clamps penetrate the PVC layer to engage the steel wire. In fact, it is undesirable for such to occur since the moisture and corrosion protection afforded by the PVC jacket would no longer be completely effective. However, since the clamp merely grips the plastic 22 it is essential that the plastic not be permitted to slide or elongate relative to the wire 21. Hence, bonding therebetween is essential.

Nevertheless, it is also important that the PVC material not bond to the insulation on the communication wire since it would then increase the difficulty of stripping the insulation when connection is desired to be effected to the conductors.

In selecting materials for the subject drop wire it should be noted that the wire must be capable of being wound into coils or onto reels for shipping and handling without damage to either the conductors or insulation. The wire must be strong enough to traverse spans of 200 feet or more without risk of tensile failure when assaulted by wind, snow, ice or combinations thereof. Instead of copper clad steel, use can be made of galvanized steel, but the copper clad type is presently preferred. If galvanized wire is desired, it is recommended that use be made of 0.062" HS steel per ASTM 475 electro-galvanized with at least ½ oz. zinc/sq. ft. The overall dimensions of the wire will vary with the number of wire pairs grouped in the side portions. Generally, a PVC layer of about 30 mils thickness is desired around the surface of revolution containing the group of twisted pairs.

By way of summary to this point, a new drop wire is produced containing plural pairs of communication gage conductors that are insulated such that the conductors remain suitably protected in all respects after being separated from the central steel support wire. Consequently, with one installation operation, two or more pairs of communication wires can be strung enabling a plurality of separate local lines to be placed in operation, as desired. The shielding between pairs is adequate to handle PCM carrier traffic as well as standard telephone communication.

Although the insulation on each conductor has been identified as high density polyethylene, other insulative materials can be used such as polypropylene.

The embodiments described above contain two or more pairs of individually insulated wire conductors in twisted groups. However, for certain signal handling tasks the foregoing wire may not be adequate. In such case a wire such as shown in FIG. 8 may be necessary. As seen therein, the twisted pair 12 of the embodiment of FIG. 4, for example, has been replaced by a coaxial cable 80, having a copper or other electrically conductive wire core 81, surrounded by polyolefin insulation 82, e.g., polyethylene, which is then surrounded by the usual outer conductor layer 83 of metalized plastic and wire braid 84. In all other respects the structure can be the same as described with reference to either FIG. 4 or FIG. 7. In the latter case, the coaxial cable 80 can replace one of the star quad groups 50 or 51.

Another modification incorporates optical fibre conductors. Thus, in FIG. 9, instead of the coaxial cable 80 of FIG. 8, there is substituted an optical fibre conductor 90 protected by its usual primary coating, not shown, and its secondary coating 91 of polyolefin material, the latter providing protective jacketing or buffering for the fibre in known manner. This jacketed optical conductor is then non-adherently embedded in the PVC material in wire portion 28. The remainder of the wire can be the same as described with reference to FIGS. 4, 7 or 8, with the wire containing, in addition to the optical fibre conductor, a steel support wire and either a single or quad pair of metallic conductors or a coaxial cable conductor.

In FIG. 10, there is shown a modification of the embodiment of FIG. 9, wherein a pair of jacketed optical fibre conductors 100 and 101 are embedded in side portion 28 of the wire.

All of the embodiments described with reference to FIGS. 8, 9 and 10, as with the previously described embodiments, provide for separating the side portions of the wire from the central portion in such manner that the signal conductors, whatever the form, remain protected by a completely encircling layer of the PVC material until such time as the PVC material is intentionally stripped to permit connection to be made to the conductor. When, however, it is desired to strip away the PVC material, it will separate readily from the underlying polyolefin material.

Having described the invention with reference to the presently preferred embodiments thereof it should be evident to those skilled in the subject art that various changes in material and construction can be introduced without departing from the true spirit of the invention as defined in the appended claims.

What is claimed is:

1. A communication wire of generally flat construction especially adapted for telephone drop wire service, the wire being separable along longitudinal weakening lines into a central and two side portions, the central portion containing a length of steel wire surrounded by and adherently embedded in a body of PVC material, each of said side portions containing, non-adherently embedded in a continuation of said body of PVC material, at least one polyolefin covered communication conductor.

2. A communication wire according to claim 1, characterized in that said steel wire is copper clad steel.

3. A communication wire according to claim 2, characterized in that the tensile strength of said steel wire is at least 150,000 p.s.i.

4. A communication wire according to claim 1, characterized in that said steel wire has a diameter of about 64 mils.

5. A communication wire according to claim 1, characterized in that each of said side portions contains a respective group of at least two polyolefin insulated conductors, each group of said insulated conductors being twisted along its length, the lay being different as between the groups in each portion.

6. A communication wire according to claim 5, characterized in that each of said groups of insulated conductors comprises one pair of soft copper conductors within the range of 20 AWG to 24 AWG in size.

7. A communication wire according to claim 5, characterized in that at least one of said groups comprises a star quad of said insulated conductors.

8. A communication wire according to claim 7, characterized in that each of said groups comprises a star quad of said insulated conductors.

9. A communication wire according to claim 5, characterized in that said steel wire is copper clad steel having a tensile strength of at least 150,000 p.s.i.

10. A communication wire according to claim 1, characterized in that said at least one conductor in at least one of said side portions is included within a polyolefin insulated coaxial cable.

11. A communication wire according to claim 10, characterized in that the other of said side portions contains at least one pair of polyolefin insulated conductors twisted along the length thereof.

12. A communication wire according to claim 1, characterized in that at least one of said side portions contains a polyolefin jacketed optical fibre conductor.

13. A communication wire according to claim 12, characterized in that the other of said side portions contains at least one pair of polyolefin insulated metallic conductors twisted along the length thereof.

14. A communication wire according to claim 12, characterized in that said one side portion contains at least two polyolefin jacketed optical fibre conductors and the other of said side portions contains at least one pair of polyolefin insulated metallic conductors twisted along the length thereof.

15. A communication wire of generally flat construction especially adapted for telephone drop wire service, said wire containing at least two pairs of polyolefin insulated communication gage conductors in side by side twisted relationship, each pair being isolated from the other with regard to crosstalk, a conductive strengthening member extending throughout the length of said wire such that said wire has a breaking strength of at least 400 pounds, said strengthening member having a conductivity sufficient to permit its operation as a supplemental ground connection, and a weatherproofing jacketing material adherently surrounding said strengthening member and non-adherently surrounding said insulated twisted conductors uniting said twisted conductors with said strengthening member.

* * * * *